US010123582B2

(12) United States Patent
Crossman et al.

(10) Patent No.: US 10,123,582 B2
(45) Date of Patent: Nov. 13, 2018

(54) FLEXIBLE IMPACT SENSOR FOR USE WITH A HEADPIECE

(71) Applicant: I1 SENSORTECH, INC., Kirkland, WA (US)

(72) Inventors: Daniel Crossman, Ottawa (CA); Scott E. Clark, Ottawa (CA); Richard Stewart Eady, Ottawa (CA)

(73) Assignee: I1 SENSORTECH, INC., Kirkland, WA (US)

( * ) Notice: Subject to any disclaimer, the term of this patent is extended or adjusted under 35 U.S.C. 154(b) by 137 days.

(21) Appl. No.: 14/314,574

(22) Filed: Jun. 25, 2014

(65) Prior Publication Data

US 2015/0000370 A1    Jan. 1, 2015

Related U.S. Application Data

(60) Provisional application No. 61/839,426, filed on Jun. 26, 2013.

(51) Int. Cl.
*G01L 5/00*    (2006.01)
*A42B 3/04*    (2006.01)
*G01L 5/14*    (2006.01)

(52) U.S. Cl.
CPC ............ *A42B 3/046* (2013.01); *G01L 5/0052* (2013.01); *G01L 5/14* (2013.01)

(58) Field of Classification Search
CPC ......... G01L 5/0052; G01L 5/14; A42B 3/046; H01H 35/14
See application file for complete search history.

(56) References Cited

U.S. PATENT DOCUMENTS 3,144,528 A    8/1964    Pino
3,300,603 A    1/1967    Wakely
(Continued)

FOREIGN PATENT DOCUMENTS

CA    2708012 C    8/2012
GB    1468081 A    3/1977
(Continued)

OTHER PUBLICATIONS

International Search Report dated Nov. 29, 2012, PCT Patent Application No. CA2012/050600, filed Aug. 30, 2012, three pages.
(Continued)

*Primary Examiner* — Blake A Tankersley
(74) *Attorney, Agent, or Firm* — Davis Wright Tremaine LLP

(57) ABSTRACT

An impact sensor for characterizing impact at a headpiece comprises: a flexible base; an acceleration sensor provided on the flexible base and configured to generate impact data; a control unit provided on the flexible base and configured to receive the impact data from the acceleration sensor; a power source provided on the flexible base and in communication with the acceleration sensor and the microcontroller; a communication module provided on the flexible base and configured to send impact data for processing; and a housing enclosing the flexible base, the acceleration sensor, the microcontroller and the power source, the housing shaped and constructed for mounting an interior surface of the headpiece such that it is flush with internal geometry of the headpiece.

13 Claims, 6 Drawing Sheets

(56) References Cited

U.S. PATENT DOCUMENTS

| | | | |
|---|---|---|---|
| 3,599,222 | A | 8/1971 | Franklin et al. |
| 3,649,788 | A | 3/1972 | Heckendorf |
| 3,656,352 | A | 4/1972 | Low et al. |
| 3,715,535 | A | 2/1973 | Urenda |
| 3,790,727 | A | 2/1974 | Laserson et al. |
| 3,972,038 | A | 7/1976 | Fletcher et al. |
| 4,063,052 | A | 12/1977 | Grosseau |
| 4,114,450 | A | 9/1978 | Shulman et al. |
| 4,198,990 | A | 4/1980 | Higgins et al. |
| 4,284,862 | A | 8/1981 | Overman et al. |
| 4,502,035 | A | 2/1985 | Obenauf et al. |
| 4,524,773 | A | 6/1985 | Fischell et al. |
| 4,536,629 | A | 8/1985 | Diller |
| 4,543,457 | A | 9/1985 | Petersen et al. |
| 4,559,516 | A | 12/1985 | Schott et al. |
| 4,757,714 | A | 7/1988 | Purdy et al. |
| 4,763,275 | A | 8/1988 | Carlin |
| 4,862,394 | A | 8/1989 | Thompson et al. |
| 5,177,331 | A | 1/1993 | Rich et al. |
| 5,287,562 | A | 2/1994 | Rush, III |
| 5,378,865 | A | 1/1995 | Reneau |
| 5,390,367 | A | 2/1995 | Rush, III |
| 5,513,854 | A | 5/1996 | Daver |
| 5,539,935 | A | 7/1996 | Rush, III |
| 5,546,609 | A | 8/1996 | Rush, III |
| 5,621,922 | A | 4/1997 | Rush, III |
| 5,697,099 | A | 12/1997 | Siska, Jr. et al. |
| 5,828,138 | A | 10/1998 | McIver et al. |
| 5,916,181 | A | 6/1999 | Socci et al. |
| 5,955,667 | A | 9/1999 | Fyfe |
| 5,978,972 | A | 11/1999 | Stewart et al. |
| 5,990,427 | A | 11/1999 | Lammert et al. |
| 6,048,324 | A | 4/2000 | Socci et al. |
| 6,157,298 | A | 12/2000 | Garfinkel et al. |
| 6,730,047 | B2 | 5/2004 | Socci et al. |
| 6,798,392 | B2 | 9/2004 | Hartwell et al. |
| 6,826,509 | B2 | 11/2004 | Crisco, III et al. |
| 6,925,851 | B2 | 8/2005 | Reinbold et al. |
| 6,941,952 | B1 | 9/2005 | Rush, III |
| 7,054,784 | B2 | 5/2006 | Flentov et al. |
| 7,386,401 | B2 | 6/2008 | Vock et al. |
| 7,526,389 | B2 | 4/2009 | Greenwald et al. |
| 7,570,170 | B2 | 8/2009 | Wallner |
| 7,660,692 | B2 | 2/2010 | Van Albert et al. |
| 7,715,982 | B2 | 5/2010 | Grenfell et al. |
| 7,919,718 | B2 | 4/2011 | Watanabe et al. |
| 7,941,873 | B2 | 5/2011 | Nagely et al. |
| 7,956,302 | B1 | 6/2011 | Jean et al. |
| 7,966,154 | B2 | 6/2011 | Vock et al. |
| 2005/0177929 | A1 | 8/2005 | Greenwald et al. |
| 2006/0038694 | A1 | 2/2006 | Naunheim et al. |
| 2008/0256687 | A1 | 10/2008 | Spencer |
| 2009/0013210 | A1* | 1/2009 | McIntosh ............ H04L 12/2697 714/4.1 |
| 2009/0235761 | A1 | 9/2009 | Song |
| 2010/0186203 | A1 | 7/2010 | Thomas |
| 2010/0307223 | A1* | 12/2010 | Jeftic-Stojanovski ...................... G01L 5/0052 73/12.04 |
| 2011/0028818 | A1 | 2/2011 | Moberg et al. |
| 2012/0191397 | A1* | 7/2012 | Eatwell .................... A61B 5/11 702/94 |
| 2012/0304767 | A1* | 12/2012 | Howard ................. A42B 3/046 73/504.03 |
| 2013/0060489 | A1 | 3/2013 | Crossman et al. |
| 2014/0094676 | A1* | 4/2014 | Gani .................... A61B 5/0404 600/386 |

FOREIGN PATENT DOCUMENTS

| | | |
|---|---|---|
| GB | 2296855 A | 7/1996 |
| GB | 2460852 A | 12/2009 |
| WO | 198002468 A1 | 11/1980 |
| WO | 198910166 A1 | 11/1989 |
| WO | 200039591 A1 | 7/2000 |
| WO | 2005034666 A1 | 4/2005 |
| WO | 2005058083 A3 | 8/2005 |
| WO | 2005074735 A1 | 8/2005 |
| WO | 2007129129 A1 | 11/2007 |
| WO | 2008085511 A1 | 7/2008 |
| WO | 2008108711 A1 | 9/2008 |
| WO | 2009006406 A1 | 1/2009 |
| WO | 2007088544 A3 | 4/2009 |
| WO | 2009070886 A1 | 6/2009 |
| WO | 2009070887 A1 | 6/2009 |
| WO | 2010006075 A1 | 1/2010 |
| WO | 2010116017 A1 | 10/2010 |
| WO | 2010123188 A1 | 10/2010 |
| WO | 2011050391 A1 | 5/2011 |

OTHER PUBLICATIONS

Khazan, "Acceleration Switch," from "Transducers and Their Elements," Prentice Hall, Inc., Sep. 6, 2006 [retrieved Feb. 9, 2011], http://zone.ni.com/devzone/cda/ph/p/id/11, 1 page.

* cited by examiner

FLEXIBLE IMPACT SENSOR FOR USE WITH A HEADPIECE

CROSS REFERENCE TO RELATED APPLICATIONS

This application claims the benefit of priority of U.S. Provisional Patent Application No. 61/839,426 filed Jun. 26, 2013, which is hereby incorporated by reference.

FIELD

The present disclosure relates to a sensor for use with a headpiece, including but not limited to a protective helmet. More particularly, the present disclosure relates to an impact sensor used to gather data at a headpiece.

BACKGROUND

A headpiece is a device worn on the head as an ornament or to serve a function. A headpiece, or headwear, refers to any type of helmet, hat, head band, mask, toque, cap, or other item, device or garment worn on the head, for the purposes of protection, fashion or any other function or combination of functions.

Protective headpieces provide protection from external forces in workplaces or recreational environments. For example, protective helmets are used by firefighters and other emergency service workers, construction workers, tradesmen, professional and amateur athletes, as well as by children participating in sports and recreational activities. Some participants in sports or recreational activities choose to wear a headpiece, such as a ski or snowboard hat, that is designed primarily for fashion or protection from cold weather, rather than protection from external forces, such as impact forces.

A sports helmet protects the wearer from injury by absorbing force in situations involving impact. However, particularly in sports such as hockey, football, and lacrosse, concussions and head injuries are still a concern even when players wear protective helmets.

It is important to be able to identify situations in which a person should seek medical attention, particularly if expert advice is not available at the time.

Some prior approaches provide a sensor, such as using one or more accelerometers, to measure acceleration of a sports helmet due to an impact force. Such impact sensors are typically designed for use on an outer surface of a helmet, and are not easily adapted to use inside a helmet, due to space restrictions and concerns for a wearer's safety.

Improvements in impact sensors for headpieces are desirable.

BRIEF DESCRIPTION OF THE DRAWINGS

Embodiments of the present disclosure will now be described, by way of example only, with reference to the attached Figures.

DETAILED DESCRIPTION

Figure 1:
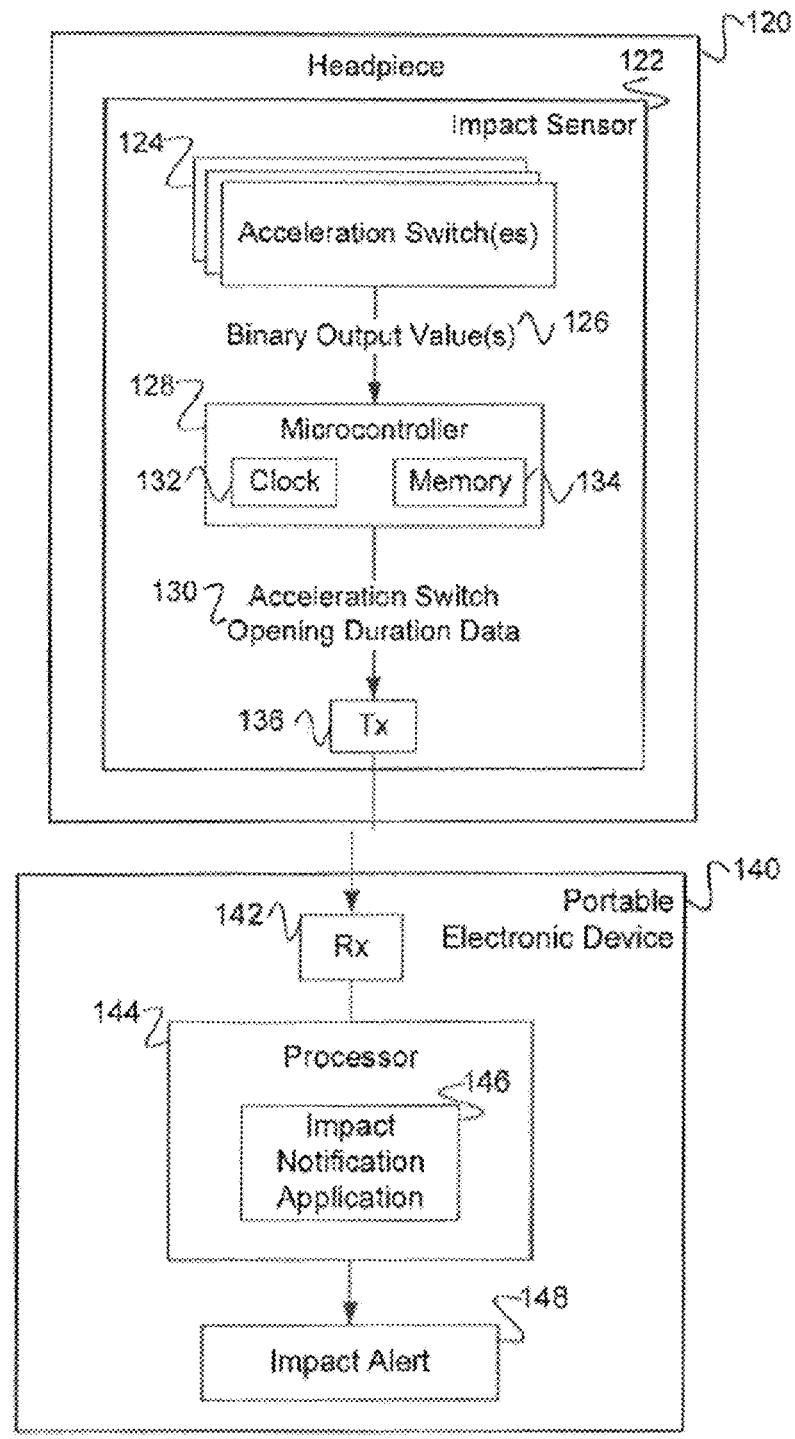
FIG. 1 is a block diagram of an example of a system for characterizing impact at a headpiece in accordance with an example embodiment.

An impact sensor to measure impact at a headpiece, for example a protective helmet, comprises at least one acceleration switch or accelerometer positioned on or in the helmet. A printed circuit board housing a control unit, such as a microcontroller, is configured to identify and store acceleration switch or accelerometer data, such as based on the binary output values of the at least one acceleration switch or accelerometer. In an example embodiment, a processor at a portable electronic device, different from the impact sensor, receives the acceleration switch opening duration data and determines whether the experienced impact force is associated with an impact force magnitude that is within a predetermined head injury range of magnitude. In an example embodiment, an impact alert is generated when the impact force magnitude is within the predetermined head injury range of magnitude. In an example embodiment, the portable electronic device displays a severity indication and an identifier of a person associated with the sensor that experienced impact.

In an embodiment, the present disclosure provides an impact sensor for characterizing impact at a headpiece, comprising: a flexible base; an acceleration sensor provided on the flexible base and configured to generate impact data; a control unit provided on the flexible base and configured to receive the impact data from the acceleration sensor; a power source provided on the flexible base and in communication with the acceleration sensor and the microcontroller; a communication module provided on the flexible base and configured to send impact data for processing; and a housing enclosing the flexible base, the acceleration sensor, the microcontroller and the power source, the housing shaped and constructed for mounting an interior surface of the headpiece such that it is flush with internal geometry of the headpiece.

In an example embodiment, the flexible base comprises a flexible printed circuit board. In an example embodiment, the flexible base comprises a plurality of interconnected printed circuit boards and at least one flexible joint.

In an example embodiment, the acceleration sensor is oriented in a direction of a reference plane of the headpiece when mounted in the headpiece. In an example embodiment: the acceleration sensor is positioned in a first orientation level with a reference plan of the headpiece when mounted, and at least one of the control unit, the power source and the communication module is positioned in a second orientation different from the first orientation when mounted.

In an example embodiment, the impact sensor further comprises: a user interface button provided in a recessed portion of the outer surface of the housing; and a charging/communication port provided at an end of the impact sensor such that it is oriented to an interior of the headpiece when installed in the headpiece.

In an example embodiment, the acceleration sensor is positioned in a first orientation, and the user interface button and the charging/communication port are positioned in a second orientation different from the first orientation when mounted.

In an example embodiment, the acceleration sensor comprises a plurality of acceleration switches. In an example embodiment, the acceleration sensor comprises at least one accelerometer. In an example embodiment, the housing comprises a flexible over-molded material. In an example embodiment, the impact sensor further comprises an acceleration sensor enclosure, provided between the acceleration sensor and the over-molded material, to prevent impact energy from resonating through the over-molded material.

An impact sensor according to an embodiment of the present disclosure is flexible enough to conform to geometries of a sports helmet shell, such as curvatures of the exterior or interior of the helmet shell.

FIG. 1 is a block diagram of an example of a system for characterizing impact at a headpiece in accordance with an example embodiment. The system includes a flexible impact sensor 122 as described herein. In an embodiment, the sensor uses components and employs methods similar to those described in U.S. patent application Ser. No. 13/225,000, filed on Sep. 2, 2011, which is hereby incorporated by reference in its entirety.

Figure 2:
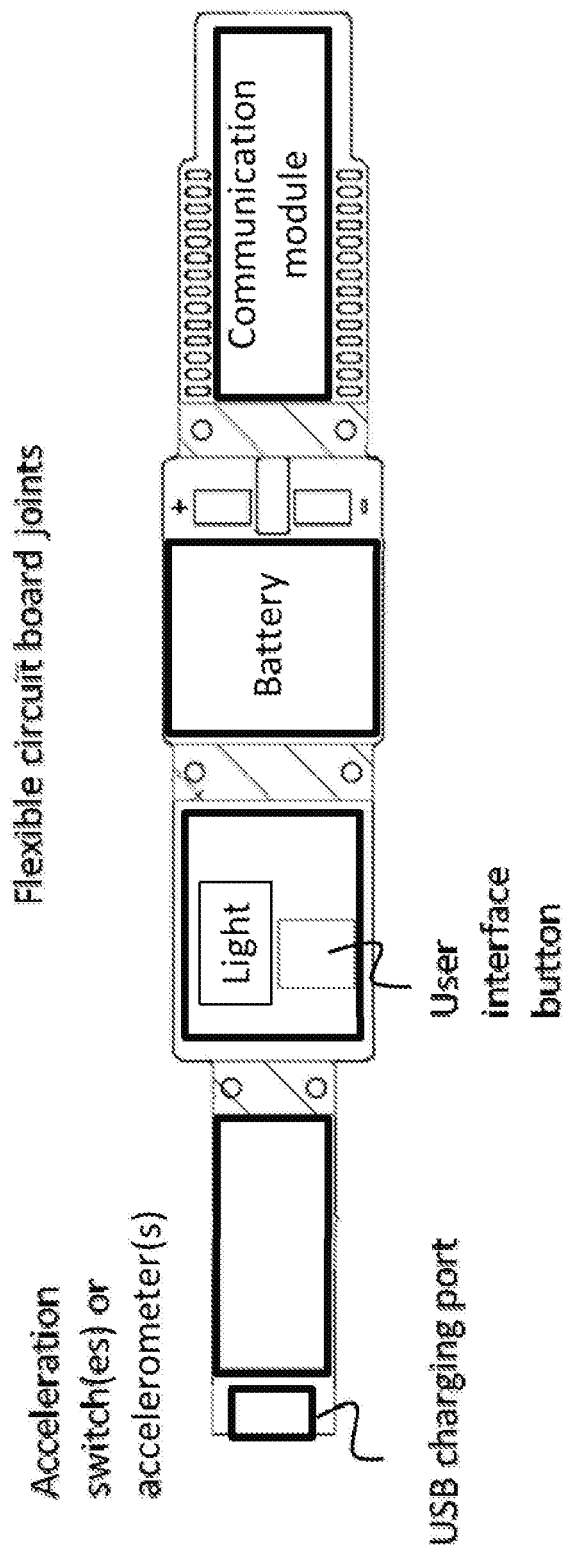
FIG. 2 illustrates an impact sensor according to an embodiment of the present disclosure.

FIG. 2 illustrates an impact sensor device including accelerometers or acceleration switches, USB charging port, processors and control interface electronics, battery and communication module (for example, Bluetooth module) according to an embodiment of the present disclosure.

In an embodiment, a printed circuit board is populated with the components for the impact sensor device to function, including but not limited to: an acceleration switch, accelerometer, battery, microcontroller and transmission means. In an example embodiment, the printed circuit board is constructed of flexible material in order to match the exterior of interior geometry of the sports helmet shell surface. In an example embodiment, the impact sensor device continues to operate normally when flexed in varied planes about the X, Y and/or Z axis.

In an example embodiment there is at least one printed circuit board populated with components and attached to another printed circuit board by means of a flexible tape connector of varied lengths, wire or other flexible conductive material to achieve the overall flexibility of the impact sensor device. In an example embodiment, the flex tape connectors between modules allow each module to be moved in any direction, within the constraints of the cable length, according to the internal geometry of the helmet. In an example embodiment, the acceleration sensor is positioned level to the reference plans of the helmet (i.e. horizontal) whereas all other modules can be at any orientation. This is to ensure that the X, Y and Z axes have a standard reference point from which to read acceleration direction and magnitudes.

Figure 3:
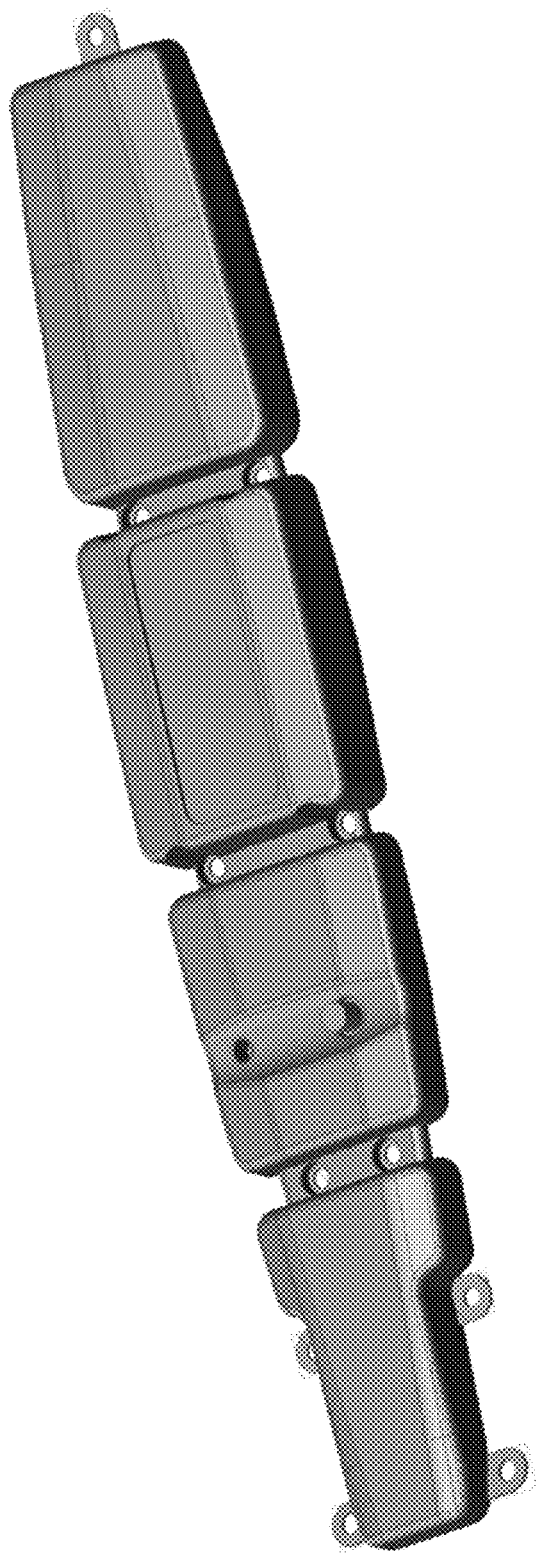
FIGS. 3-4 illustrate different views of exemplary embodiments of an impact sensor according to the present disclosure.
Figure 4:
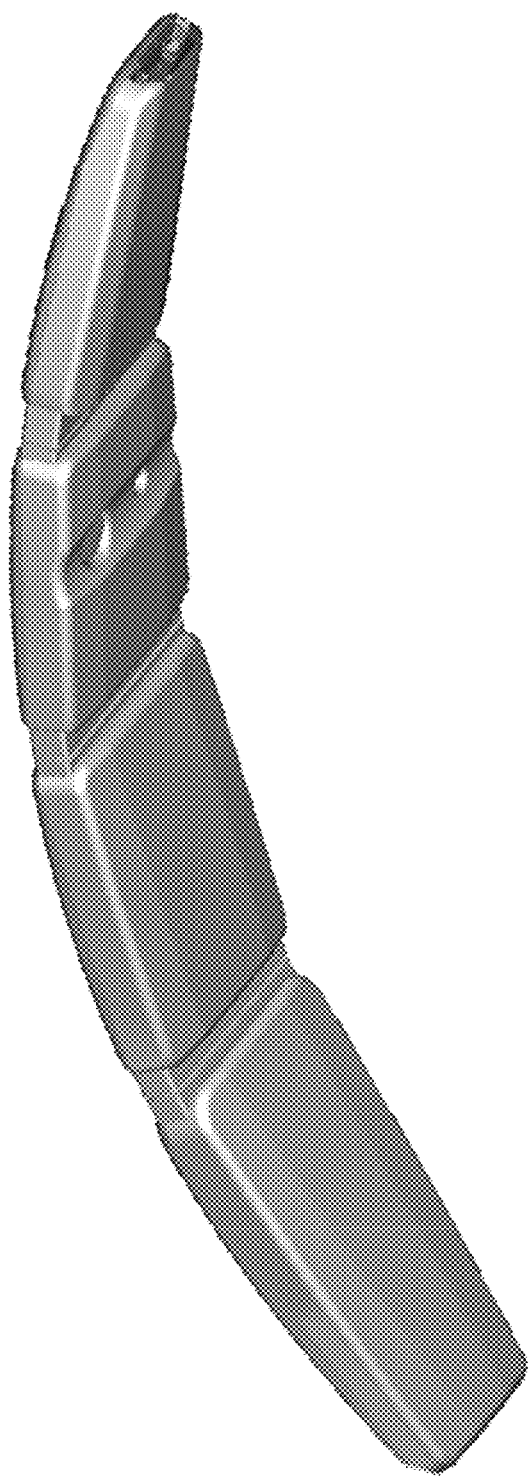
Figure 5:
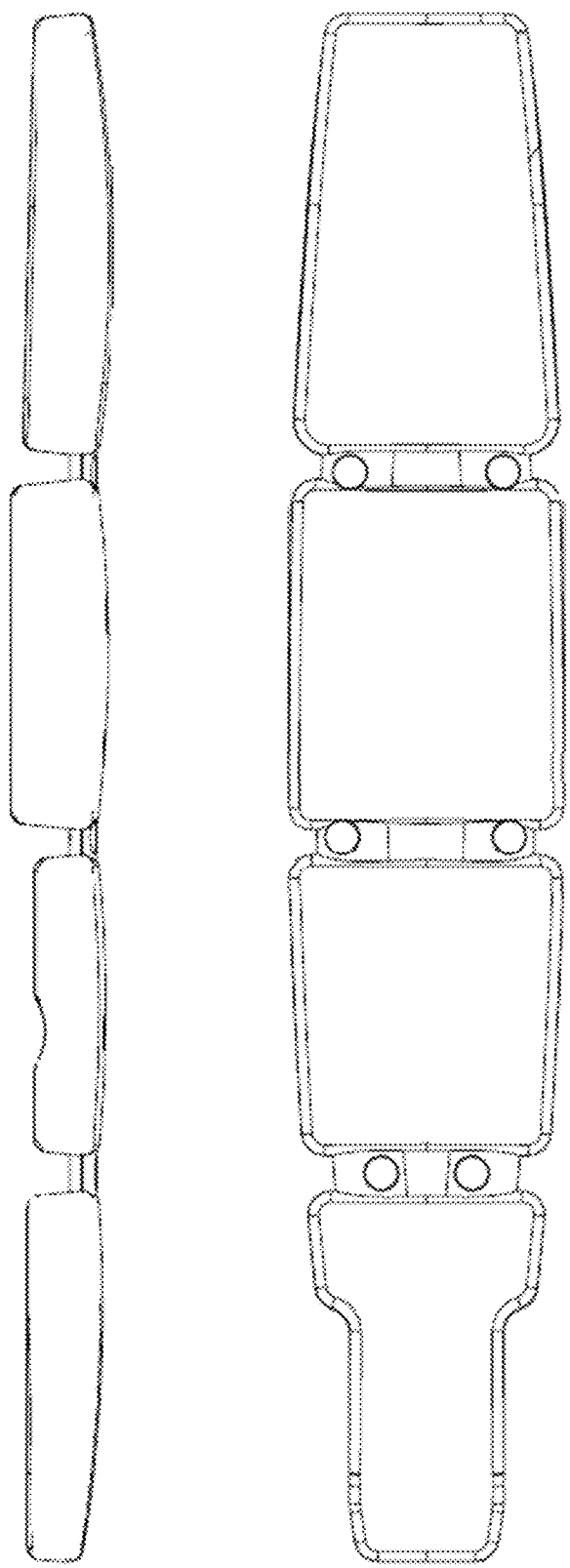
FIG. 5 illustrates a different view of the flexible joints of the impact sensor according to an embodiment of the present disclosure.

FIGS. 3 and 4 illustrate different views of exemplary embodiments of an impact sensor device according to the present disclosure. FIG. 5 illustrates a different view of the flexible joints of the impact sensor device according to an embodiment of the present disclosure.

Figure 6:
FIG. 6 describes and illustrates the over-mold technology used in embodiments of the present disclosure.

FIG. 6 illustrates the over-mold technology used in embodiments of the present disclosure. Overmolding the components allows them to be curved in individual cross section so that it does not present an angular protrusion where the head could impact against it. FIG. 6 shows over-molded samples according to an embodiment of the present disclosure having at least one of the following features or properties: housing conforms to shell; material surrounds all parts; hermetic seal on encapsulated parts; minimal wall thickness needed; low cost prototype tooling; range of durometers available (adhesive compatible); connectors and switches can be accommodated; thermoset and low pressure injection moulding options available; and/or multi-shot moulding is possible to achieve variable assembly properties. In an example embodiment, the acceleration sensor module comprises a small enclosure to prevent the overmold material from touching the impact/force switches, in order to prevent impact energy from resonating through the module and triggering too early.

In an embodiment, a impact sensor device is encapsulated or molded in a protective material, in order to protect the components on the printed circuit board and to conform flexibly to the exterior or interior geometry of the helmet shell, enable access to certain components required for charging a battery power supply; and enable functional operation or visibility of at least one user interface button or light emitting diode. In an example embodiment, the user interface button positioned to enable a user to press the user interface button that is otherwise recessed into the protective material to protect it from unwanted operation.

In an example embodiment, the protective material used to mold over the printed circuit board is a soft material to allow the protected impact sensor device to flex according to the interior or exterior geometry of the helmet shell.

In an example embodiment, the method used to mold the printed circuit board into the protective material further comprises injection molding, potting or encapsulation of the printed circuit board within one or more pieces of protective material or depositing protective material about the printed circuit board so as to completely contain the printed circuit board leaving access to the user interface button or light emitting diode and components required for charging the battery power supply.

In an example embodiment, the method further comprises providing a recess for the user interface button, light emitting diode and component for battery charging through the use of a shaped mold or press into which the protective material is poured, injected or deposited thereby creating additional protective material around the user interface button in order to protect it from unwanted or accidental operation.

In an example embodiment, the method further comprises providing a joint or pivot point in the protective material through the use of a shaped mold or press into which the protective material is poured, injected or deposited thereby creating at least one natural joint of flexibility across the length or breadth of the impact sensor device. In an example embodiment, the material within the at least one joint is thinner than the material on either side of the at least one joint to allow it to flexibly conform to the exterior or interior geometry of the helmet shell.

In another example embodiment, a thin and flexible adhesive tape or adhesive backed hook and loop fabric is adhered to the surface of the protective material containing the flexible printed circuit board and used to securely fasten the impact sensor device to the exterior or interior surface of the helmet shell and enabling easy removal without special tools. In an example embodiment, a match of the helmet shell or headpiece exterior or interior surface geometry is maintained to prevent accidental removal of the impact sensor device from the helmet shell, and to provide a secure mounting from which the impact sensor device can measure impact experienced at the helmet shell or headpiece.

In an example embodiment, the present disclosure provides a flexible circuit board or at least one interconnected circuit boards populated with at least one accelerometer or acceleration switch connected by flexible conductive tape connectors or wires. These components are encapsulated in a flexible over-molded or potted material with at least one flexible joint between printed circuit boards. A recessed user interface button and charging port are also provided. In an example embodiment, the at least one accelerometer or acceleration switch are positioned on the headpiece to detect acceleration of the headpiece due to an impact force that exceeds a prescribed acceleration threshold, the detected acceleration being along more than one axis, the binary output values observed during a period of time including the impact.

An impact sensor according to an embodiment of the present disclosure can be beneficial in any type of headpiece, whether or not the headpiece is intended for protective purposes.

Examples of protective headpieces, such as protective helmets, include, but are not limited to: protective helmets used by firefighters and other emergency service workers, construction workers, tradesmen, professional and amateur athletes, and children participating in sports and recreational activities; bicycle helmets; motorcycle helmets; rock climbing helmets; military helmets; football helmets; hockey helmets; lacrosse helmets; ski helmets; cricket helmets; baseball helmets; protective hart hats; mixed martial arts helmets; welding helmets; etc.

Examples of headpieces not intended for impact protection, but in relation to which an impact sensor according to embodiments of the present disclosure can be used, include but are not limited to: ski hats; snowboard hats; balaclavas; masks; toques; caps; headbands; sweatbands; sun hats; visors; goggles, etc.

While embodiments have been described herein with respect to a headpiece, it is to be understood that such embodiments can be incorporated into any type of personal protective equipment, including clothing, helmets, goggles or other garment or equipment designed to protect any portion of the wearer's body from injury.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. An impact sensor for characterizing impact at a headpiece, comprising:
a flexible base;
an acceleration sensor provided on the flexible base and configured to generate impact data;
a control unit provided on the flexible base and configured to receive the impact data from the acceleration sensor;
a power source provided on the flexible base and in communication with the acceleration sensor and the control unit;
a communication module provided on the flexible base and configured to send impact data for processing; and
a housing enclosing the flexible base, the acceleration sensor, the control unit and the power source, the housing shaped and constructed to define a plurality of surfaces along an arc of curvature of the impact sensor to contact a human head when the headpiece is worn and the impact sensor is mounted to a surface of the headpiece such that it is flush with internal geometry of the headpiece, wherein at least one portion of the acceleration sensor comprises an enclosure to prevent the acceleration sensor from being inadvertently triggered from resonations through the housing that occur due to impact energy.

2. The impact sensor of claim 1 wherein the flexible base comprises a flexible printed circuit board.

3. The impact sensor of claim 1 wherein the flexible base comprises a plurality of interconnected printed circuit boards and at least one flexible joint.

4. The impact sensor of claim 1 wherein the acceleration sensor is oriented in a direction of a reference plane of the headpiece when mounted in the headpiece.

5. The impact sensor of claim 1 wherein:
the acceleration sensor is positioned in a first orientation level with a reference plane of the headpiece when mounted, and
at least one of the control unit, the power source and the communication module is positioned in a second orientation different from the first orientation when mounted.

6. The impact sensor of claim 1 further comprising:
a user interface button provided in a recessed portion of the outer surface of the housing; and
a charging/communication port provided at an end of the impact sensor such that it is oriented to an interior of the headpiece when installed in the headpiece.

7. The impact sensor of claim 6 wherein:
the acceleration sensor is positioned in a first orientation, and
the user interface button and the charging/communication port are positioned in a second orientation different from the first orientation when mounted.

8. The impact sensor of claim 1 wherein the acceleration sensor comprises a plurality of acceleration switches.

9. The impact sensor of claim 1 wherein the acceleration sensor comprises at least one accelerometer.

10. The impact sensor of claim 1 wherein the housing comprises a flexible over-molded material.

11. The impact sensor of claim 10 further comprising an acceleration sensor enclosure, provided between the acceleration sensor and the over-molded material, to prevent impact energy from resonating through the over-molded material.

12. The impact sensor of claim 1, wherein the surface is an interior surface of the headpiece.

13. The impact sensor of claim 1, wherein the housing comprises a protective material, and wherein the protective material that is positioned between at least two of the acceleration sensor, the control unit, and the power source consists of thinner material than the protective material that encloses the acceleration sensor, the control unit, and the power source.

* * * * *